A. M. JENSEN.
VEGETABLE WASHER.
APPLICATION FILED MAR. 5, 1908.
927,051.
Patented July 6, 1909.
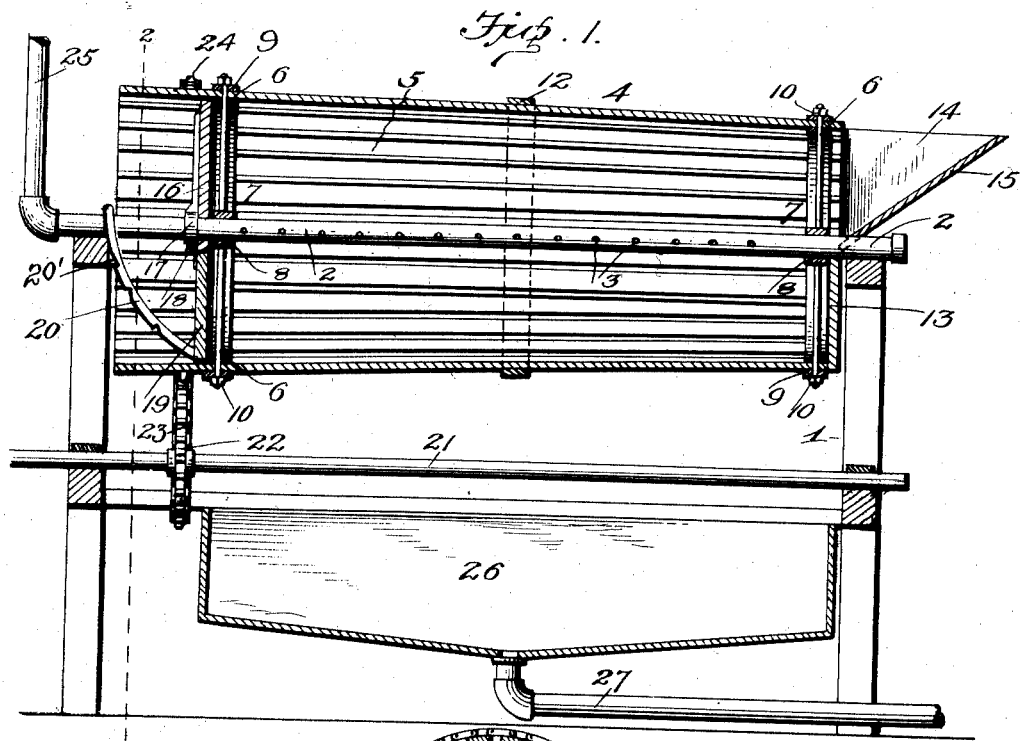
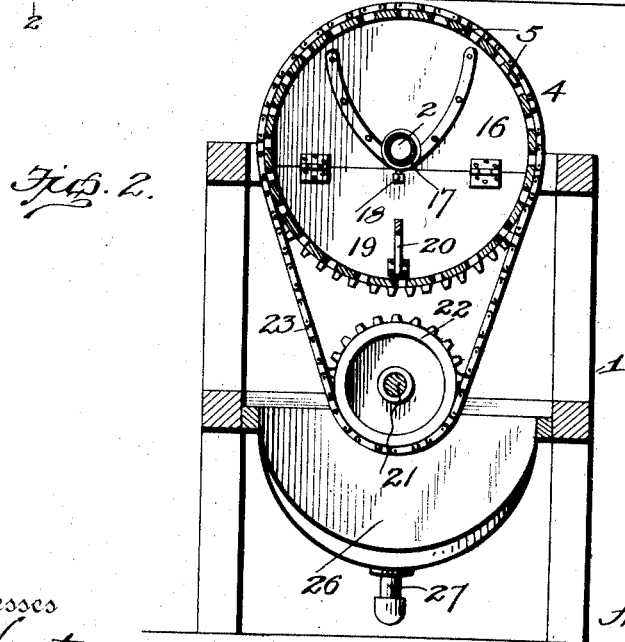

UNITED STATES PATENT OFFICE.

ANTON M. JENSEN, OF LEYDEN TOWNSHIP, COOK COUNTY, ILLINOIS.

VEGETABLE-WASHER.

No. 927,051.   Specification of Letters Patent.   Patented July 6, 1909.

Application filed March 5, 1908. Serial No. 419,374.

*To all whom it may concern:*

Be it known that I, ANTON M. JENSEN, a citizen of the United States, residing in Leyden township, in the county of Cook and State of Illinois, have invented certain new and useful Improvements in Vegetable-Washers; and I do declare the following to be a full, clear, and exact description of the invention, such as will enable others skilled in the art to which it appertains to make and use the same.

This invention relates to improvements in vegetable washers.

The object of the invention is to provide a machine of this character in which large quantities of vegetables may be thoroughly washed and cleaned, means being provided whereby the washed vegetables may be discharged from the delivery-end of the machine.

With this object in view, the invention consists of certain novel features of construction, combination and arrangement of parts as will be described and particularly pointed out in the claim.

In the accompanying drawings, Figure 1 is a vertical longitudinal sectional view of the washer; and Fig. 2 is a vertical cross sectional view of the same on the line 2—2 of Fig. 1.

In the embodiment of the invention I provide a supporting frame 1, in the upper end of which is fixedly mounted a tubular shaft, 2, in a portion of the length of which is formed a series of perforations or discharge apertures, 3. Revolubly mounted on the shaft, 2, is a substantially cylindrical receptacle, 4, the sides of which are formed of slats, 5, which are spaced apart a suitable distance, and are secured adjacent to their opposite ends to the rims or bands, 6, of supporting wheels, 7, the spokes of which are secured at their inner ends to hubs, 8, which are revolubly mounted on the shaft, 2. The slats, 5, are further held in position by means of bands or hoops, 9, arranged around the outer sides thereof over the rims, 6, the ends of the spokes passing through said hoops and rims, and on the projecting ends of said spokes are screwed nuts, 10. Midway between the hoops, 9, is arranged a similar hoop, 12.

The receptacle, 4, preferably tapers and is slightly smaller at its inlet end than at its discharge end. The lower half of the inlet end of the receptacle is closed by a plate or board, 13, while in the upper half of the inlet end is arranged a feed chute, 14, having an inclined bottom, 15. The discharge end of the receptacle is closed by a head, 16, which is slidably secured to the shaft, 2, by a collar, 17, and set screw, 18. The lower portion of the head, 16, is separate from and hinged to the upper portion to provide a discharge door, 19, which, when opened, permits the washed vegetables to pass out or be discharged from the receptacle. The door, 19, is held in closed position in any suitable manner, but is here shown as provided with a curved brace bar, 20, which is notched to engage a lug 20' on the frame 1.

In the lower portion of the supporting frame 1 is mounted an operating shaft, 21, on which is fixedly mounted a sprocket gear, 22, with which is engaged a sprocket chain, 23, said chain passing around the slatted receptacle, 4, adjacent to its discharge end and is engaged with an annular series of sprocket teeth, 24, secured to the slats of the receptacle. Any suitable power may be applied to the shaft 21 to operate the washer through the sprocket gearing hereinbefore described.

The tubular shaft, 2, is closed at one end, and to its opposite end is connected a water supply pipe, 25, which may lead to a tank or other source of supply not shown. In the frame 1, below the operating shaft, 21, is arranged a discharge tank, 26, which is substantially semi-cylindrical in shape, and is closed at its opposite ends. The bottom of the tank preferably inclines to a slight degree from its opposite ends toward its center, and to the lowest portion of the inclined bottom is connected a discharge pipe, 27, through which the water from the tank is carried off.

In operation the vegetables are placed in the chute, 14, and discharged therefrom into the inlet end of the slatted receptacle, 4, which is revolved in the manner hereinbefore described, thus causing the vegetables to roll around and against one another, which action, together with the water discharged thereon through the perforations in the tubular shaft, 2, thoroughly washes and removes all dirt from the vegetables, after which they are discharged from the rear end of the receptacle through the opening provided therefor in the head, 16. The wash water, after working its way around and between the vegetables, passes out between the slats, 5, of the receptacle and is caught by the discharge tank, 26, from which it is carried off through the pipe 27 connected therewith.

A washer constructed as herein shown and described is capable of quickly and thoroughly washing large quantities of vegetables and preparing the same for the market.

From the foregoing description, taken in connection with the accompanying drawings, the construction and operation of the invention will be readily understood without requiring a more extended explanation.

Having thus described my invention, what I claim as new and desire to secure by Letters-Patent, is:

In a vegetable washer, a pair of separated supports, a fixedly mounted perforated spray shaft secured to said supports, a tapering slatted cylinder journaled on said shaft, a non-rotary head fixedly mounted on the shaft within and at the front end of said cylinder closing the lower portion of that end, a hopper arranged on the upper half of said end, a second non-rotary head slidably mounted upon said shaft and within the rear end of the cylinder, said head comprising an upper stationary section and a lower hinged section forming a door, a lug on the rear support, a notched segmental member secured to said door and adapted to engage said lug to adjust the opening of said door, a tank positioned under the cylinder to receive the waste water and means arranged intermediate the cylinder and tank for rotating the former.

In testimony whereof I have hereunto set my hand in presence of two subscribing witnesses.

ANTON M. JENSEN.

Witnesses:
OLE NELSON,
CARL AARSETH.